(No Model.)

R. N. BROWNLEE.
STALK CUTTER.

No. 460,843. Patented Oct. 6, 1891.

WITNESSES:
Chas. Nida
C. Sedgwick

INVENTOR:
R. N. Brownlee
BY
ATTORNEYS

UNITED STATES PATENT OFFICE.

ROBERT N. BROWNLEE, OF BEND, TEXAS, ASSIGNOR OF ONE-HALF TO EDGAR HOUSE, OF SAME PLACE.

STALK-CUTTER.

SPECIFICATION forming part of Letters Patent No. 460,843, dated October 6, 1891.

Application filed April 8, 1891. Serial No. 388,139. (No model.)

*To all whom it may concern:*

Be it known that I, ROBERT N. BROWNLEE, of Bend, in the county of San Saba and State of Texas, have invented a new and Improved Stalk-Cutter, of which the following is a full, clear, and exact description.

My invention relates to improvements in machines for cutting stalks, and the machine is especially adapted for cutting cotton-stalks or cornstalks, although it may be used for cutting any variety of stalks.

The object of my invention is to produce a machine of simple construction which may be readily adjusted to any desired angle, and which will cut the stalks into any desired number of pieces.

To this end my invention consists in a stalk-cutter constructed substantially as hereinafter described and claimed.

Reference is to be had to the accompanying drawings, forming a part of this specification, in which similar figures of reference indicate corresponding parts in all the views.

Figure 1:
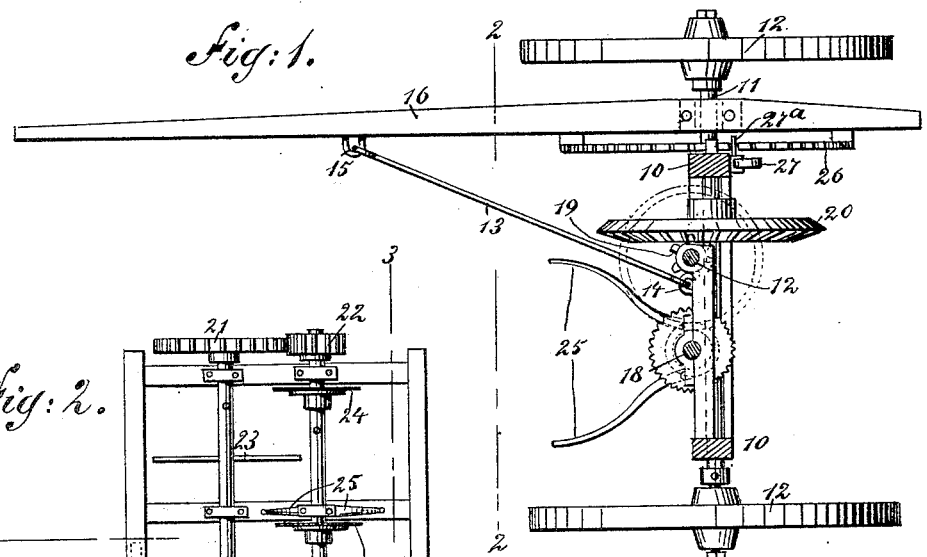
Figure 2:
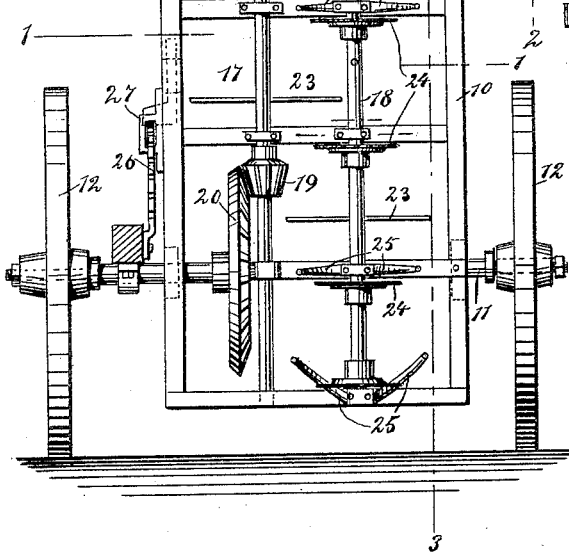
Figure 3:
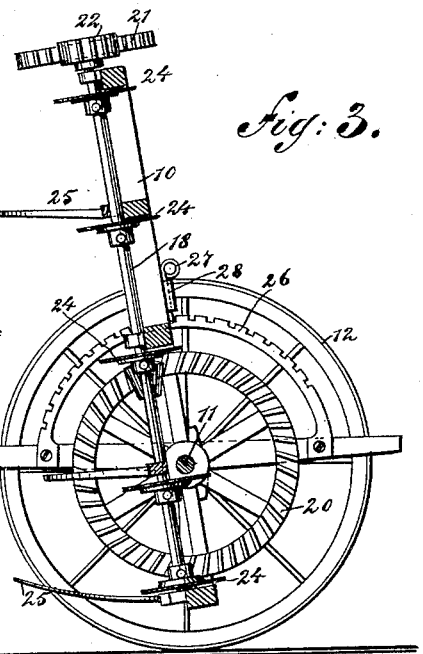

Figure 1 is a sectional plan view of the stalk-cutter on the line 1 1 in Fig. 2. Fig. 2 is a front elevation, partly in section, on the line 2 2 of Fig. 1, and Fig. 3 is a vertical longitudinal section on the line 3 3 in Fig. 2.

The machine is provided with a main frame 10, which is arranged vertically and is pivoted near its lower end on the axle 11, which is secured to the wheels 12, and the frame is held in an approximately fixed position by means of a rod 13, which is pivoted to an eye 14 on the front side of the frame and which hooks at its free end into an eye 15 on the tongue 16 of the machine. The machine is preferably arranged so that the frame will incline forward, as shown in Fig. 3, and the tongue may be provided with a suitable seat.

The main frame 10 carries two vertical and parallel shafts 17 and 18, which revolve in suitable boxes, and the shaft 17 is provided with a bevel-pinion 19, which meshes with a gear-wheel 20 on the axle 11, and the upper end of the shaft 17 projects a little above the top of the frame and carries a gear-wheel 21, which meshes with a pinion 22 on the upper end of the shaft 18, so that when the machine is moved the two shafts will be revolved. The shafts 17 and 18 are provided with rods 23, which revolve with them and which have a tendency to swing in the stalks, so that they may be cut by the saws in a manner hereinafter described.

The shaft 18 is provided with a series of saws 24, which are arranged one above the other, and any desired number may be used, according as the stalks are to be cut into finer or coarser pieces.

Adjacent to a portion of the saws are guides 25, which are secured to cross-pieces on the frame and which project beyond the periphery of the saws, the guides diverging as they extend forward, as is best shown in Fig. 1, and it will be seen that the arms of the guides will carry the stalks against the saws when the machine is drawn along the row of the stalks.

Adjacent to one side of the frame 10 is a semicircular rack 26, which is secured to the tongue 16, and the tongue 16 is pivoted on the axle so as to be independent of the main frame.

On the side of the main frame, near the rack 26, is a pin 27, which slides in a keeper 28, and which has a laterally-extending portion 27 to engage the teeth of the rack 26, as is best shown in Fig. 1, and it will be seen that the incline of the frame may be accurately fixed by adjusting the pin in the teeth of the rack. It will be noticed that the lower guides 25 are curved upward, so that there will be no danger of running them into the ground, and any desired number of the guides may be used, according to the kind of stalks that are to be cut.

The operation of the machine is as follows: It is drawn forward upon a row of stalks with the frame inclined forward, as shown in Fig. 3, and the tops of the stalks will be first engaged by the upper saws 24, and each succeeding saw will engage the stalks and cut them off, so that the stalks will be finely cut. As the machine is drawn along, the revolving rods 23 will serve to swing the stalks inward, so that they will come within the range of the guides 25, and, in consequence of the rods and guides, all the stalks will be cut.

Having thus fully described my invention, I claim as new and desire to secure by Letters Patent—

1. A stalk-cutting machine comprising an axle secured in driving-wheels and provided with a tongue, a frame pivoted on the axle and adjustably connected with the tongue, vertical parallel shafts mounted in the frame, said shafts being geared together and driven by the axle, a series of saws carried by one shaft, diverging guide-arms secured to the frame adjacent to the saws and projecting forwardly therefrom, and a series of cross-rods secured to the shaft opposite the saw-shaft, substantially as described.

2. A stalk-cutting machine comprising an axle secured in drive-wheels, a frame pivoted on the axle, a rack and pin, a hook-and-eye connection between the frame and tongue, a pair of vertical parallel shafts mounted in the frame, the shafts being geared together and one of them being geared to the axle, a series of saws carried by one of the shafts, and a series of guides secured to the frame to carry the stalks to the saws, substantially as shown and described.

3. In a stalk-cutting machine, the combination, with the main frame and the vertical revoluble shafts therein, one of the shafts being provided with saws and guides, of cross-rods secured to the shafts, substantially as described.

ROBERT N. BROWNLEE.

Witnesses:
L. O'BRIEN,
ED. HOUSE.